March 11, 1930.  E. W. DUNBAR  1,750,165
OVERSHOE AND METHOD OF MAKING THE SAME
Filed May 5, 1925   3 Sheets-Sheet 1
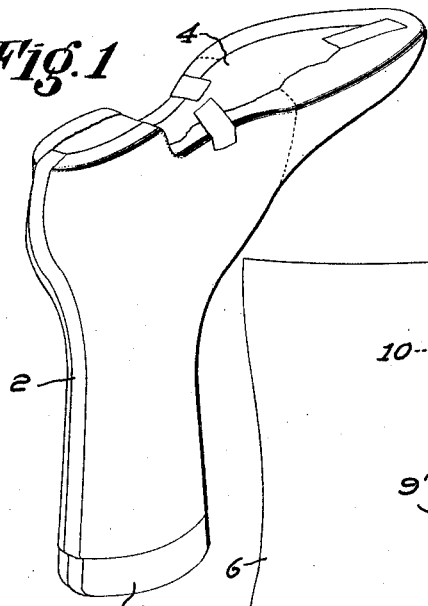
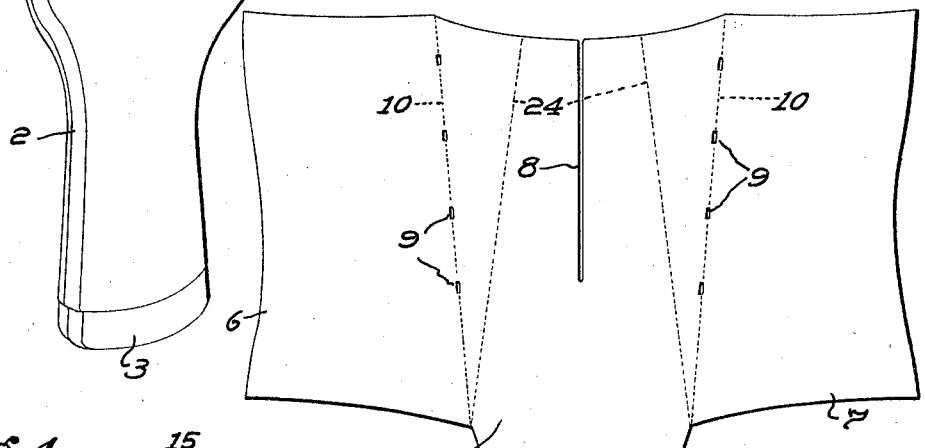
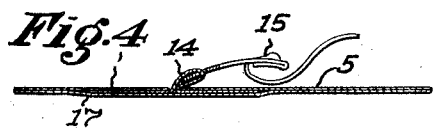
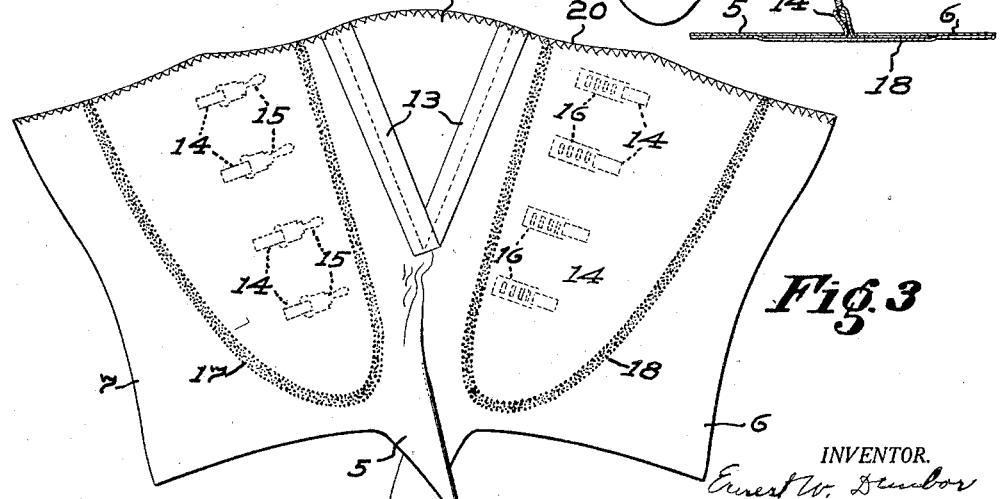
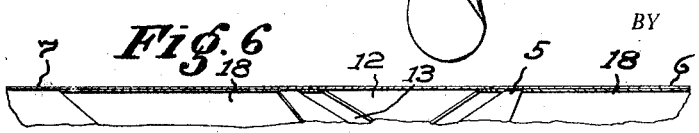
INVENTOR.
Ernest W. Dunbar
BY
ATTORNEY.

March 11, 1930.  E. W. DUNBAR  1,750,165
OVERSHOE AND METHOD OF MAKING THE SAME
Filed May 5, 1925   3 Sheets-Sheet 2
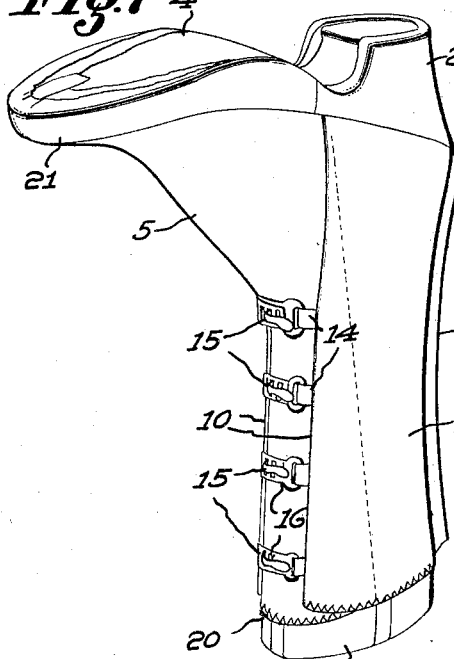
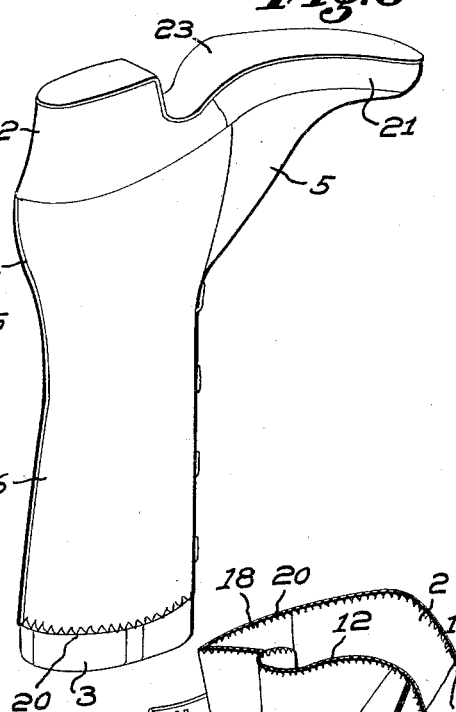
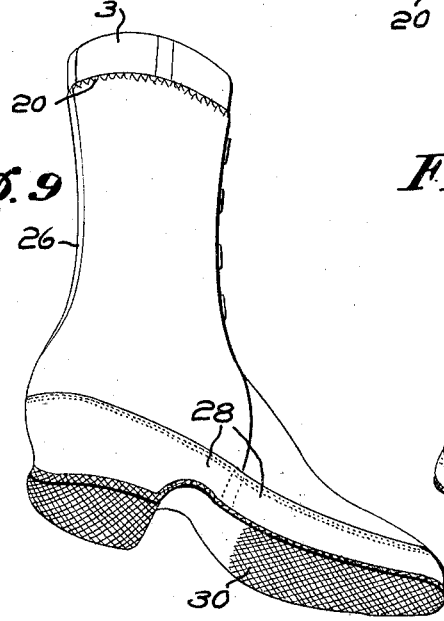
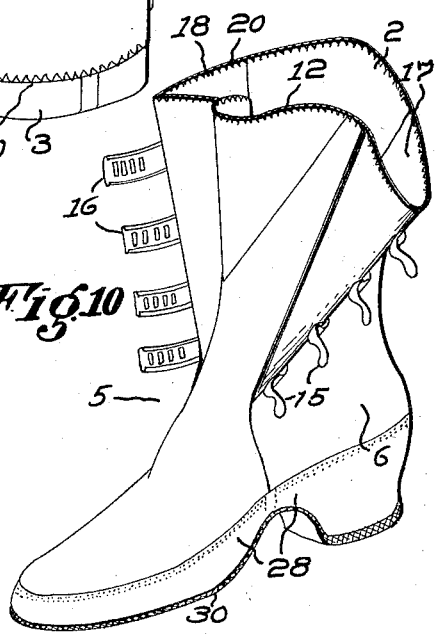
INVENTOR.
Ernest W. Dunbar
BY
J. H. M'Cready
his ATTORNEY.

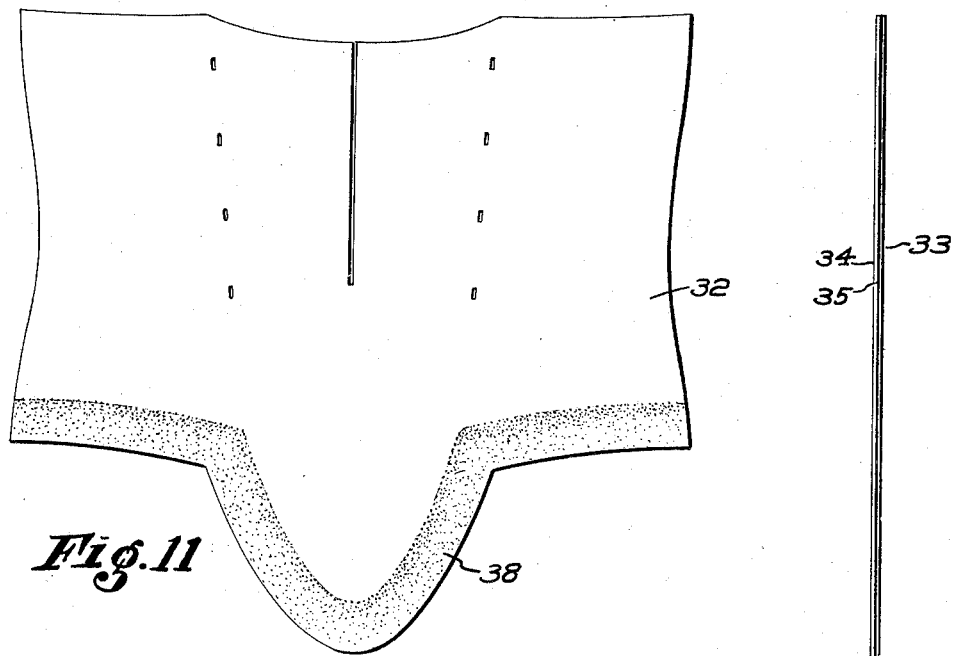
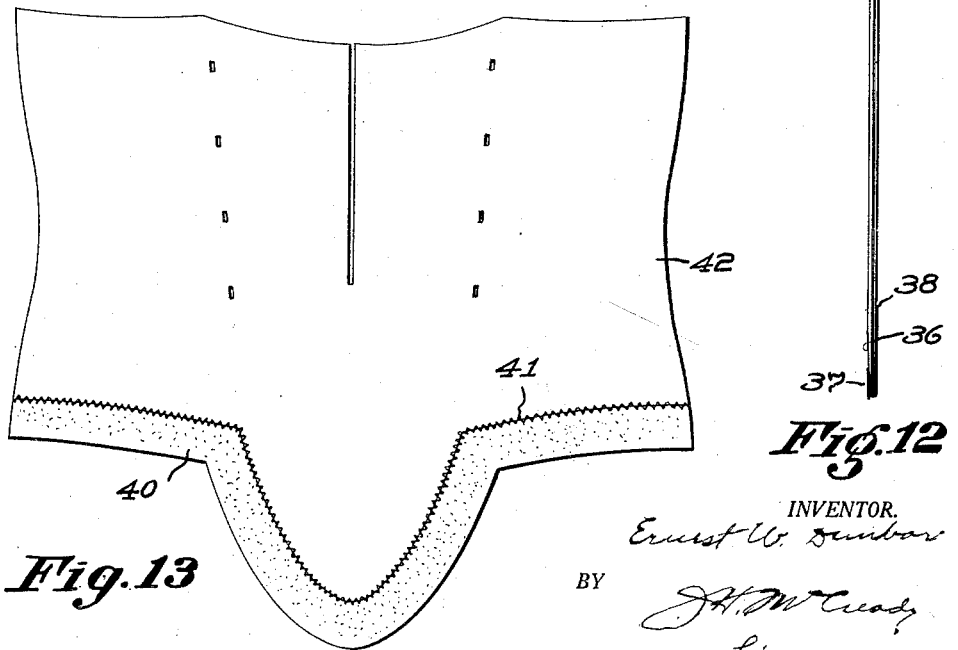

Patented Mar. 11, 1930

1,750,165

UNITED STATES PATENT OFFICE

ERNEST W. DUNBAR, OF HUDSON, MASSACHUSETTS, ASSIGNOR TO CAMBRIDGE RUBBER COMPANY, OF CAMBRIDGE, MASSACHUSETTS, A CORPORATION OF MASSACHUSETTS

OVERSHOE AND METHOD OF MAKING THE SAME

Application filed May 5, 1925. Serial No. 28,098.

This invention relates to the manufacture of vulcanized shoes of the bellows top type and known under various names, such as galoshes, arctics, buckle gaiters, high overshoes, and the like.

The uppers of shoes of this class usually are made from a rubberized fabric that may be either woven or knitted, and the inner rubberized surface of the fabric is covered with a lining which is secured to the outer fabric by a rubber coating. The common methods of manufacture of shoes of this type involve the handling of a relatively large number of separate parts, and the assembling of these parts in the proper relationship to each other on a last. Usually the lining is first placed on the last, and then the other pieces, such as the quarters, vamp, collars, junior and sole parts are added one at a time, all these parts being adhesively secured to each other. When the making operations have been completed the shoe is vulcanized, thus curing the rubber parts of the shoe.

The present invention has for its chief object to effect economies in the manufacture of footwear of this type.

To this end the invention contemplates the manufacture of the outer fabric of the upper in a single integral piece. It has been proposed heretofore to make a vulcanized rubber shoe with a folded one-piece top, but so far as I have been able to learn only low shoes having a single buckle have been manufactured in this way. Any attempt to make higher shoes in this manner has been unsuccessful due largely to the difficulty in finding some satisfactory way of attaching the buckles or other fastenings to the top of the shoe. In a single buckle shoe, such as the rubber shoes above mentioned, this difficulty has been avoided by attaching buckle straps to the top edge of the shoes above the folds, but it is obvious that such a construction is applicable only to a low shoe. Consequently, it is a further object of this invention to devise a satisfactory attachment for the buckles or other fastenings in a high top shoe of this type.

The invention involves both improvements in the construction of footwear of the character indicated, and also in the method of manufacture of such footwear.

The nature of the invention will be readily understood from the following description when read in connection with the accompanying drawings, and the novel features will be particularly pointed out in the appended claims.

Referring now to the drawings,

Figure 1 is a perspective view showing a lining stretched on a last, lasted to an insole and ready to receive the outer fabric;

Fig. 2 is a plan view of a combined vamp and quarters embodying certain features of the invention;

Fig. 3 is a view of the outer fabric of the upper after certain of the manufacturing operations have been performed;

Figs. 4 and 5 are cross sectional views showing the method of attaching the buckles;

Fig. 6 is a fragmentary cross sectional view of the parts shown in Fig. 3;

Figs. 7, 8 and 9 are perspective views showing the shoe at various stages of manufacture;

Fig. 10 is a perspective view of a finished shoe;

Fig. 11 is a plan view of a modified upper embodying features of this invention;

Fig. 12 is a side elevation of the upper shown in Fig. 11 but on a larger scale; and Fig. 13 is a view similar to Fig. 11 of another upper construction.

According to the method illustrated in Figs. 1 to 10 inclusive, the lining 2, Fig. 1, is first cut out of rubberized fabric, stretched on a last 3, as shown in said figure, and the lower edge of the lining is lasted over on the margin of an insole 4 which is placed on the bottom of a last. This part of the process may be performed according to the practice common at the present time.

The vamp and quarters for the upper are now cut out of a suitable rubberized fabric, but instead of being cut in at least three pieces, as has been customary heretofore, they are cut out in a single continuous integral piece. This construction is shown in Fig. 2, the vamp being indicated at 5, and the right and left quarters at 6 and 7, respectively. The upper may be made either with or without a gusset in the vamp. Usually, however, such a gusset is used, and consequently, a slit 8 is cut in approximately the median line of the vamp to receive the gusset. This combined quarter and vamp blank may be made from any suitable stock, such, for example, as the knit fabric commonly used in making overshoes, or a woven fabric of a suitable character, such as sateen. The cloth is rubberized, that is, heavily coated with rubber on one surface, while it is still in the piece, and then the vamp and quarter blank is cut out of it.

The buckles or other fastenings to be used in holding the top of the shoe closed are secured to the upper by straps, and in the arrangement shown slots 9 are cut through the combined vamp and quarter piece to receive these straps. These slots are cut in two lines 10—10, at opposite sides of the median line of the vamp, and along which this part of the upper subsequently will be folded to form a bellows top for the shoe.

When a gusset 12 is used, it is usually cut out of the same fabric as that of which the vamp and quarters are cut, and the slit 8 is spread apart and the gusset inserted, as shown in Fig. 3, its edges being abutted against the edges of the slit 8 and secured in this position by stay strips 13.

The buckles now are attached to the upper by inserting each buckle strap 14 through one of the slots 9, the strap first having been placed through the eye or slot of its snap 15 or clasp 16 of the buckle, as the case may be, and the legs of the strap preferably are then spread apart and pressed against the inner surfaces of the vamp and quarter as clearly shown in Figs. 4 and 5. These straps are made of a rubberized fabric with the rubber surface outside so that they readily stick to the inner rubberized surfaces of the vamp and quarters. Next, lining strips 17 and 18 of rubberized fabric, usually fleeced, and like the lining 2, are secured to the inner surfaces of the vamp and quarter piece where they will not only conceal the ends of the buckle straps 14, but will also line the portions of the vamp and quarters which subsequently will be folded to form the bellows pockets. The inner edges of these lining pieces 17 and 18 are rubberized also, as indicated by their shaded margins in Fig. 3, so that these edges will stick securely to the outer rubberized surface of the lining 2 when these parts later are brought together.

In order to give the shoe a more finished appearance I prefer to bind or overseam the upper edges of the vamp and quarters, as indicated at 20, and this operation may be conveniently performed at this point in the process.

Usually at this or some earlier stage of the process a binder strip or collar 21, Fig. 7, is placed around the forepart of the last where it overlaps the last bottom and also extends upwardly along the sides of the forepart and shank for a substantial distance, as clearly shown in the drawings. The usual stiffening member or junior 22 is also applied at this time, and another sole piece 23, Fig. 8, is placed over the insole 4.

The vamp and quarters prepared, as above described, are now placed on the last over the lining 2, are worked into the proper relationship to the last and to the lining, the vamp is folded substantially on the lines 10 and 24, Fig. 2, to form the bellows top, and the outer fabric is pressed firmly against the lining, usually by rolling, so as to securely unite the rubberized surfaces of the inner and outer fabrics. The rearward edges of the quarters are brought together at the back of the leg where they form a projecting flange or fin 25, Fig. 7, this fin subsequently being trimmed off and leaving simply a narrow and relatively inconspicuous seam 26. The foxing 28 now is placed around the margin of the bottom of the shoe where it covers the binder strip 21 and junior 22. The outer sole 30 is placed in position, and the usual wheeling and ornamenting operations are performed. It will be understood that some latitude is permissible in the order in which the parts of the shoe are assembled, the order above described being typical.

The shoe next is vulcanized, thus permanently uniting the parts which heretofore have been only temporarily secured together by the adhesion of the rubberized surfaces.

When the vulcanization has been completed, the straps placed across the top of the last, as shown in Figs. 7, 8 and 9, to hold the upper stretched are cut off, and the buckles which have been fastened during vulcanization to hold the upper in its folded condition are unfastened. The lining 2 is then cut down the leg at opposite sides thereof to open the bellows pockets. This lining has been joined to the lining pieces 17 and 18 for the bellows pockets, by the adhesive margins of the latter pieces, and the sections of the lining 2 between the margins of each piece are trimmed away. This opens the bellows pockets for their entire length, these pockets being of approximately the usual tapered form, relatively wide at the top and gradually narrowing in width as they extend downwardly. The shoe may now be slipped off the last.

This shoe may be manufactured at a material saving over the cost of manufacture of other shoes of a corresponding type and quality. It requires the handling of fewer pieces, a smaller number of dies is used, and fewer cutting operations are necessary. The assembling or making operations also are facilitated by the integral vamp and quarter construction. Furthermore, the shoe is superior in certain respects to the more common overshoe constructions, particularly in having fewer joints through which water may leak, unless special care is taken to make them tight, and in presenting a top which can be opened wider, for a given width of fabric, to permit the admission or withdrawal of the foot than can overshoes of the usual constructions. The joints between the vamp and quarters at the opposite sides of the shank are particularly difficult to make tight in the ordinary overshoes and these joints are eliminated by the present invention. In overshoes of the common constructions the buckle straps are located in what is known as the buckle pocket; that is, the vamp and quarters are cemented together for a considerable distance back from the edges from which the straps project, and this construction therefore reduces very materially the width to which the top can be opened. In the present shoe the vamp and quarters are entirely free from each other except at the lines of fold 10—10. Consequently, the top can be opened for the entire width allowed by the dimensions of the fabric. This method of folding the top and securing the buckles thereto is of further advantage in permitting the manufacture of a top of any desired height. It will be observed that the top is so folded that the opposite folds or double edges 10—10 which separate the vamp and quarters and which are secured together by the buckles, extend substantially parallel to each other up the front of the shoe so that differences in height of the shoes or in the number of buckles used introduce no additional problems in the manufacturing operations.

In the modification illustrated in Figs. 11 and 12, the combined vamp and quarter blank 32 is like that shown in Fig. 2 except that it is cut from a laminated fabric having an outer ply 33, Fig. 12, and an inner ply 34, these two plies being joined together by an intermediate layer 35 of rubber. This fabric is made by rubberizing the outer and inner plies and then uniting them while the goods are in the piece. Subsequently, the integral vamp and quarter blank 32 is cut out of this laminated fabric. In order to last this upper to the insole, the lower inside margin of this vamp and quarter piece 32 preferably has the fleece buffed or skived therefrom, as indicated at 36, Fig. 12, thus reducing the thickness of this edge of the goods, and the lower part of this thinned margin is rubberized, as shown at 37, while a much wider part of the outer margin of the fabric is rubberized, as indicated at 38. When this upper is lasted to the insole, the margin 37 is stuck to the insole. During the subsequent making operations, the foxing is placed over the rubberized surface 38 and sticks to it.

Instead of rubberizing the lower parts of the laminated fabric itself, a separate lasting strip 40, Fig. 13, may be secured, as by staggered stitching 41, to the lower margin of the upper 42, which is like the upper 32 except for the difference in dimensions.

In performing the making operations with either of the uppers 32 or 42, the gusset preferably it stitched to the edges of the slit in the vamp and the rear edges of the quarters may also be stitched together. The buckle straps are inserted through the slots, as in the construction above described, and the ends of the straps within the bellows pockets preferably are concealed by narrow stay strips secured to the lining 33.

When the upper has been completed it is then placed on a last like that shown, for example, in Fig. 1, and the lasting strip 40 or the lower margin 38 of the upper, depending upon the construction used, is lasted to an insole placed on a bottom of the last. The binding strip or collar, junior, intermediate sole, foxing and outsole may then be assembled with the other parts of the shoe in substantially the manner above described. The shoe then is vulcanized. It will be understood, of course, that before vulcanization the upper will be folded into a bellows form, the folds smoothed out, and the buckles fastened to hold the upper in its folded condition during vulcanization.

This shoe requires the handling of even fewer parts than the shoe shown in Figs. 1 to 10 since the lining and outer fabric of the upper are in one piece. In manufacturing this shoe, also, practically all of the making operations on the upper may be performed before it is placed on the last so that a much greater output can be obtained from a given number of lasts.

While I have herein shown and described the best forms of my invention that I have so far devised, it will be evident that the invention is not limited to embodiment in the precise forms shown but may be embodied in other constructions without departing from the spirit or scope thereof. For example, I have found it possible to omit the binder strip or collar 21. Also, the skiving or buffing of the margin 38 in the construction shown in Figs. 11 and 12 to remove the fleece is not always necessary, it being possible to cement the fleeced surface itself.

Having thus described my invention, what I desire to claim as new is:

1. A vulcanized overshoe having a rubber bottom and a waterproof top comprising a vamp and quarters integral with each other, the quarters overlapping portions of the vamp and cooperating therewith to form a bellows top, said top having two substantially parallel folds extending up the front of the shoe, and a plurality of pairs of fastenings, the individual members of which are secured, respectively, between said folds, whereby said members may be fastened to each other across the front of the upper to secure it about the leg of the wearer.

2. A vulcanized overshoe having a rubber bottom and a waterproof fabric top comprising a vamp and quarters integral with each other, the vamp being folded and cooperating with the quarters to form a bellows top presenting two substantially parallel folds extending up the front of the overshoe, and a plurality of fastenings secured to said folds within the fabric thereof and adapted to fasten across the front of the upper to hold the top snugly around the ankle of the wearer.

3. A vulcanized overshoe having a waterproof top including quarters and a vamp folded to form a bellows top and having two double edges extending up the front of the shoe where the vamp and quarters meet, buckle straps located between said edges, each strap having two legs separated from each other and lying, respectively, against the inner faces of the vamp and quarter and secured to said faces, said vamp and quarters being free from each other at the top of the shoe except at said edges.

4. A vulcanized shoe comprising a waterproof upper including quarters and a vamp integral with each other and composed of a laminated fabric having an outer ply and an inner lining ply adhesively secured thereto throughout its area and substantially coextensive therewith, each ply consisting of a single piece of fabric, and a rubber bottom secured to said upper.

5. A vulcanized shoe comprising an upper including quarters and a vamp integral with each other and having an outer ply and an inner lining ply co-extensive with each other, a rubber bottom, a rubberized lasting strip joining the lower margin of said upper to said bottom, and a foxing covering said lasting strip.

6. A vulcanized shoe comprising an upper including quarters and a vamp integral with each other and having an outer ply and an inner lining ply co-extensive with each other, the lower margin of said upper being reduced in thickness, an insole to which said reduced margin is adhesively joined, a rubber outsole covering said insole, and a foxing joining said outsole to the upper.

7. That improvement in the art of manufacturing a vulcanized shoe having a bellows top which consists in cutting out of rubberized fabric an upper comprising a vamp and quarters integral with each other, securing cooperating fastenings to said upper along lines substantially on which the upper is to be folded at opposite sides of the vamp, subsequently assembling said upper on a last with the other parts of the shoe, folding said upper on said lines at some stage in the process, and subsequently vulcanizing the shoe.

8. That improvement in the art of manufacturing a vulcanized shoe having a bellows top which consists in cutting out of rubberized fabric an upper comprising a vamp and quarters integral with each other, cutting slots in the upper along the lines on which the upper is to be folded at opposite sides of the median line of the vamp, inserting buckle anchoring straps through said slots and securing them to the inner surface of the upper, subsequently assembling said upper on a last with the other parts of the shoe, and then vulcanizing the shoe.

9. That improvement in the art of manufacturing a vulcanized shoe, which consists in providing a laminated fabric having an outer wearing ply and an inner lining ply united to each other through an intermediate coating of rubber, cutting out of said fabric, in a single piece, the vamp and the quarters of an upper, assembling said upper on a last with an insole, folding said upper to form a bellows top, adhesively uniting said upper with the other parts of the bottom of the shoe, and then vulcanizing the shoe while holding said upper in its folded condition.

10. That improvement in the art of manufacturing a vulcanized shoe, which consists in providing a laminated fabric having an outer wearing ply and an inner lining ply united to each other through an intermediate coating of rubber, cutting out of said fabric, in a single piece, the vamp and the quarters of an upper, providing a rubberized margin on the lower part of said upper, assembling said upper on a last with an insole, lasting said margin of the upper to the insole, adhesively uniting the other parts of the bottom of the shoe to said upper and insole, and then vulcanizing the shoe.

11. An article of manufacture consisting of a blank for the upper of an overshoe comprising a vamp and quarters integral with each other and including an outer fabric and a lining therefor, said fabric and lining being co-extensive and united to each other substantially throughout their entire areas.

12. A vulcanized overshoe having a waterproof bellows top comprising a vamp and quarters integral with each other and made of rubberized fabric, said top being folded to form an internal tapering pocket at each side of the leg and to provide two opposed lines of fold extending up the front of the shoe, said pockets being wide at the upper edge of the top and diminishing in width as they extend downwardly, and a plurality of fastenings at opposite edges of said bellows top for holding said top snugly about the leg of the wearer, said fastenings including parts extending through said top at said lines of fold and secured to the top within said pockets.

13. A vulcanized overshoe having a rubber bottom and a waterproof fabric top comprising a vamp and quarters integral with each other, the vamp being folded and cooperating with the quarters to form a bellows top presenting two folds extending up the front of the overshoe, and fastening means secured to said top adjacent to said folds and adapted to fasten across the front of the upper to hold the top snugly around the ankle of the wearer.

14. A vulcanized overshoe having a rubber bottom and a waterproof fabric top comprising quarters and a vamp integral with each other and composed of a laminated fabric having an outer ply and a continuous inner ply adhesively secured thereto throughout its area and substantially coextensive therewith, said vamp being folded and cooperating with the quarters to form a bellows top, and fastening means including parts secured to said top at opposite sides of the bellows and adapted to fasten across the front of the upper to hold the top snugly around the ankle of the wearer.

ERNEST W. DUNBAR.